No. 824,703. PATENTED JULY 3, 1906.
F. BELL.
TOILET TIDY.
APPLICATION FILED MAY 22, 1905.
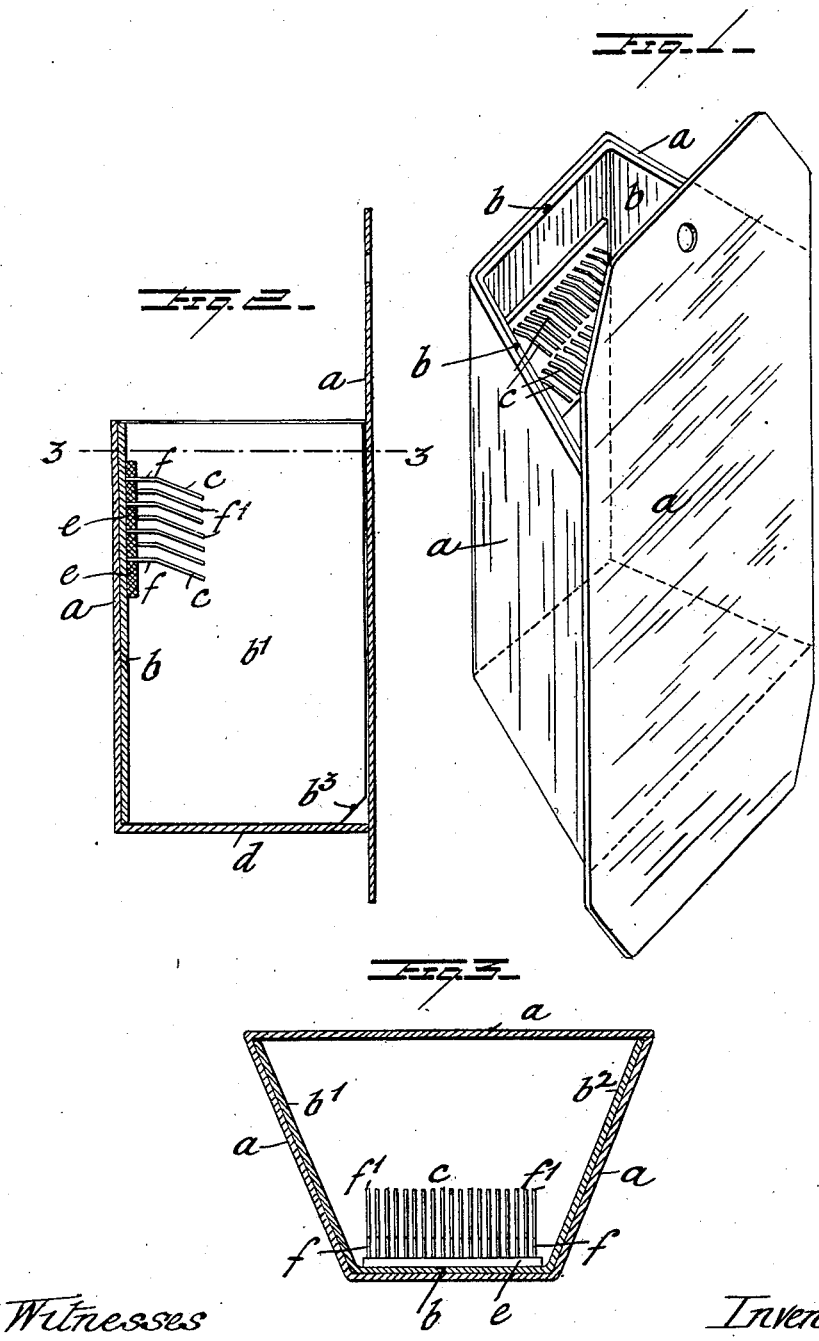
Witnesses
Inventor
Frank Bell
by his Attorney

UNITED STATES PATENT OFFICE.

FRANK BELL, OF TUNBRIDGE WELLS, ENGLAND.

TOILET-TIDY.

No. 824,703.　　　Specification of Letters Patent.　　　Patented July 3, 1906.

Application filed May 22, 1905. Serial No. 261,550.

*To all whom it may concern:*

Be it known that I, FRANK BELL, a subject of the King of England, residing at Tunbridge Wells, in the county of Kent, England, have invented certain new and useful Improvements in Toilet-Tidies, of which the following is a specification.

This invention relates to toilet-tidies; and the object is, first, to construct same in such a manner that they more readily retain hair-combings or similar woolly or fluffy substances placed therein and, further, to enable the tidy or the like to be easily emptied or cleaned.

The invention comprises a receptacle and a removable interior bent or curved plate adapted to hold itself in said receptacle by friction against some of the sides thereof and carrying suitable brush-like devices which retain the combings or fluffy substances within said receptacle.

The accompanying drawings show the preferred form of the invention, Figure 1 being a perspective view of the toilet-tidy; Fig. 2, a central vertical section thereof, and Fig. 3 a section on the line 3 3 of Fig. 2.

The outer receptacle $a$ may consist of wood, metal, cardboard, or other suitable stiff material in the form of a polygonal or prismatic chamber open at the top, as shown in Figs. 1 and 2. Into said receptacle $a$ is inserted a bent or curved plate fitting to some of the sides and extending from top to bottom thereof and forming a backing adapted to carry brush-like bodies $c$. Said plate may be resilient, if desired, and conforms to the shape of those sides of the receptacle against which it lies and extends to the bottom $d$ thereof, so that the act of inserting the combings or the like does not alter its position therein. The plate fits within the receptacle with sufficient friction that it is held securely therein during use, but may be readily withdrawn when desired for the purpose of emptying or cleaning the tidy.

The brush-like bodies I prefer to use are shown in the drawings consisting of rigid wire prongs or teeth $c$, which may be securely held in a cloth backing $e$, secured to the plate $b$. Said teeth $d$ are preferably made with a substantially horizontal inwardly-projecting portion $f$ and are then bent in a downward direction, as at $f'$. Any desired number of rows of said teeth may be provided, two only being shown in Fig. 1 for clearness of illustration.

The side members $b'$ $b^2$ of the backing plate $b$ may be beveled, as at $b^3$, for facilitating insertion of said plate into the receptacle $a$.

What I claim as my invention, and desire to secure by Letters Patent of the United States, is—

1. A toilet-tidy comprising in combination an outer unyielding receptacle of stiff material so formed as to present two angular recesses on its interior circumference, a removable plate conforming to part of the interior circumference of said receptacle measured between said angular recesses and adapted to be inserted so that its edges engage in said angular recesses and hold said plate within said receptacle by friction, and inwardly-directed brush-like bodies carried by said plate.

2. A toilet-tidy comprising in combination an outer receptacle of stiff material of polygonal form, a removable plate conforming to part of the interior shape of said receptacle and extending down to the bottom thereof adapted to be held within said receptacle by friction and inwardly-directed brush-like bodies carried by said plate.

In witness whereof I have signed this specification in the presence of two witnesses.

FRANK BELL.

Witnesses:
　HERBERT D. JAMESON,
　ALFRED NUTTING.